US012674585B2

(12) United States Patent
Ashley et al.

(10) Patent No.: US 12,674,585 B2
(45) Date of Patent: Jul. 7, 2026

(54) COOKING HOOD VENT WITH PREDICTIVE EVENT RECOGNITION

(71) Applicant: Franke Technology and Trademark Ltd., Hergiswil (CH)

(72) Inventors: Mark Ashley, Section, AL (US); Alan Greer, Murfreesboro, TN (US); Gregory Richards, Deerfield, IL (US)

(73) Assignee: Franke Technology and Trademark Ltd., Hergiswil (CH)

( * ) Notice: Subject to any disclaimer, the term of this patent is extended or adjusted under 35 U.S.C. 154(b) by 380 days.

(21) Appl. No.: 18/487,220

(22) Filed: Oct. 16, 2023

(65) Prior Publication Data

US 2024/0125483 A1 Apr. 18, 2024

Related U.S. Application Data

(60) Provisional application No. 63/417,028, filed on Oct. 18, 2022.

(51) Int. Cl.

| | |
|---|---|
| ***F24C 15/20*** | (2006.01) |
| ***A62C 3/00*** | (2006.01) |
| ***A62C 37/38*** | (2006.01) |

(52) U.S. Cl.

CPC .......... *F24C 15/2021* (2013.01); *A62C 3/006* (2013.01); *A62C 37/38* (2013.01)

(58) Field of Classification Search

CPC ........ G06V 20/70; G06V 10/82; G06V 20/52; F24C 15/2021; A62C 37/38; A62C 3/006

See application file for complete search history.

(56) References Cited

U.S. PATENT DOCUMENTS

| | | | |
|---|---|---|---|
| 6,170,480 B1 | 1/2001 | Melink et al. | |
| 7,147,168 B1 | 12/2006 | Bagwell et al. | |
| 9,587,839 B2 * | 3/2017 | Burdett | F24C 15/20 |
| 10,195,470 B2 | 2/2019 | Livchak et al. | |
| 10,605,470 B1 | 3/2020 | Saxena et al. | |
| 10,907,839 B2 * | 2/2021 | Wu | F24C 15/2021 |
| 2003/0219240 A1 | 11/2003 | Levy et al. | |

(Continued)

FOREIGN PATENT DOCUMENTS

| | | |
|---|---|---|
| AU | 746255 B2 | 4/2002 |
| CN | 105864852 B | 8/2018 |

(Continued)

*Primary Examiner* — Alfred Basichas

(74) *Attorney, Agent, or Firm* — Volpe Koenig

(57) ABSTRACT

A cooking exhaust hood system, that has an exhaust hood adapted to be located over at least one cooking appliance and an exhaust fan connected to the exhaust hood, with the exhaust fan having a controllable exhaust air flow volume. A camera monitors a surface of the at least one cooking appliance and provide an image signal representing a visual status of the at least one cooking appliance. An image processing controller is connected to an image database and is configured to receive the image signal and to compare the visual status of the at least one cooking appliance based on the image signal to stored images in the image database. The image processing controller then output a cooking appliance status signal. An exhaust fan controller is provided that is connected to the exhaust fan. The exhaust fan controller is configured to receive the cooking appliance status signal and adjusts the exhaust fan accordingly.

8 Claims, 3 Drawing Sheets

(56) References Cited

U.S. PATENT DOCUMENTS

| | | | | |
|---|---|---|---|---|
| 2004/0035411 | A1 | 2/2004 | Livchak et al. | |
| 2005/0156053 | A1 | 7/2005 | Melink | |
| 2011/0056479 | A1 | 3/2011 | Thompson et al. | |
| 2014/0230662 | A1 | 8/2014 | Siegel et al. | |
| 2015/0097663 | A1 | 4/2015 | Sloo et al. | |
| 2015/0136430 | A1 | 5/2015 | Livchak et al. | |
| 2015/0302569 | A1 | 10/2015 | Armstrong et al. | |
| 2016/0327921 | A1 | 11/2016 | Ribbich et al. | |
| 2017/0108235 | A1 | 4/2017 | Guan et al. | |
| 2018/0372332 | A1* | 12/2018 | Cha | G06F 3/147 |
| 2019/0215184 | A1 | 7/2019 | Emigh et al. | |
| 2020/0224915 | A1 | 7/2020 | Nourbakhsh | |
| 2021/0063036 | A1 | 3/2021 | Oh et al. | |
| 2022/0156496 | A1 | 5/2022 | Drake et al. | |
| 2023/0129115 | A1* | 4/2023 | Sinur | H04L 12/2816 126/299 D |
| 2023/0314002 | A1* | 10/2023 | Heckmann | F24C 15/2021 219/446.1 |

FOREIGN PATENT DOCUMENTS

| | | | |
|---|---|---|---|
| CN | 109405014 | | 3/2019 |
| CN | 111006259 | A | 4/2020 |
| CN | 111006261 | | 4/2020 |
| EP | 0217802 | B1 | 7/1989 |
| JP | 2018084382 | A | 5/2018 |
| WO | 06054511 | | 5/2006 |
| WO | 08065332 | | 6/2008 |
| WO | 2020047938 | A1 | 3/2020 |
| WO | 2020128799 | A2 | 6/2020 |
| WO | 2020263172 | | 12/2020 |
| WO | 2023056154 | A1 | 4/2023 |

* cited by examiner

COOKING HOOD VENT WITH PREDICTIVE EVENT RECOGNITION

CROSS-REFERENCE TO RELATED APPLICATIONS

This application claims the benefit of U.S. Provisional Application No. 63/417,028, filed Oct. 18, 2022, which is incorporated herein by reference as if fully set forth.

TECHNICAL FIELD

The present invention relates to the field of cooking hoods, for example, for use in restaurants and commercial kitchen. More particularly, the invention relates to a system for recognizing events related to the cooking appliances that provides for automated vent control.

BACKGROUND

Cooking hoods are used in various applications, such as restaurants, institutional and commercial kitchen environments, in order to remove air that includes steam, vapors and/or particulate matter from items being cooked as well as other moisture laden or contaminated air generated by the cooking appliances. Cooking appliances can include griddles, burners, fryers as well as other types of food preparation equipment. Typically, the volume of air being removed by the vent system in the cooking hood is manually set by the user and remains at a consistent volume regardless of cooking load.

Cooking hoods in commercial applications also include other features, such as lighting as well as fire suppression systems.

US 2015/0136430 disclosed a cooking hood arrangement that, in addition to the normal venting function, includes a system for determining whether a fire condition exists based on a status of a cooking appliance. The system also controls an exhaust air flow rate in an exhaust air ventilation system based on the status of the cooking appliance, based on the exhaust temperature sensor and the IR radiant temperature sensor outputs, and may change the exhaust fan speed and/or related damper in response to the determined cooking appliance status.

US 2014/0230662 disclosed an intelligent control system for a range hood that is capable of automatically responding to air quality parameters such as heat, smoke, carbon monoxide, humidity, and others. The software used to provide the intelligence to the control combines aspects of both open-loop and closed-loop control, with timers making sure that once activated, the fan runs for at least a minimum amount of time, and sensors constantly monitoring the air quality to allow the system to respond to changes by moving into other operating modes as required.

It would be desirable to improve the exhaust function of cooking hoods in order to reduce or eliminate the need for manual control and to avoid the inadequacies of the known systems that may increase the ventilation in a reactive manner based on sensed air quality or temperatures reached on cooking surfaces. These inadequacies may include lag time, resulting in insufficient exhaust air flow rate, and unnecessarily high or prolonged air flow rates, resulting in wasted energy used to heat or cool the make-up air in the ventilated space.

SUMMARY

The present disclosure is directed to a cooking exhaust hood system, that has an exhaust hood adapted to be located over at least one cooking appliance, preferably a plurality of cooking appliances, such as fryers and a griddle, and an exhaust fan connected to the exhaust hood, with the exhaust fan having a controllable exhaust air flow volume. A camera, or a plurality of cameras, monitor a surface of the at least one cooking appliance and provide an image signal representing a visual status of the at least one cooking appliance. The camera is preferably a digital video camera and is mounted on or near the exhaust hood. An image processing controller that is connected to an image database is provided. The image processing controller is configured to receive the image signal, preferably a plurality or stream of image signals from the camera, and compare the visual status of at least one cooking appliance based on the image signal to stored images in the image database. The image processing controller then outputs a cooking appliance status signal, and preferably a real-time stream of signals. An exhaust fan controller is provided that is connected to the exhaust fan. The exhaust fan controller is configured to receive the cooking appliance status signal, either via a wired connection or wirelessly, and uses an algorithm to adjust the controllable exhaust air flow volume of the exhaust fan based on the specified exhaust needs of the cooking appliance.

Using this system, when the camera detects that cooking is occurring or will occur on any appliance under the exhaust hood, it sends the status signal to the exhaust fan controller which in turn, signals the exhaust fan to increase the fan speed and/or exhaust extraction volume. When the camera detects that cooking has decreased or stopped, the exhaust fan controller signals the exhaust fan accordingly. The amount of the increase or decrease is based on the specified exhaust needs for the number and type of appliances being used, as well as the volume of cooking load on each appliance.

The image processing controller is trainable to recognize at least one of cooking appliance conditions, for example a number, type, and/or on/off state of the cooking appliance(s) being used, or food items located on the cooking appliance, and preferably uses image detection to adapt to minor variations in cooking conditions to accurately generate the cooking appliance status signal. For example, this can be based on a number of fry baskets that are recognized as being lowered in the frying vat, a number of patties or food articles such as chicken breasts on a griddle or cook top surface, or other recognized items on the griddle or cook top, based on images stored in the image database, or combinations thereof. The exhaust fan controller can therefore react and adjust the exhaust fan and/or damper in the exhaust hood based on the cooking appliance status signal that results in a predictive rather than purely reactive control.

Further, the image processing controller is trainable to recognize cleaning equipment, for example a cleaning bucket or other cleaning appliance, and the cooking appliance condition for cleaning can be signaled to the exhaust fan controller so that the exhaust fan flow volume can be increased, for example, prior to water being poured on a hot surface for cleaning.

Further, the image processing controller may be trained to identify visual occlusions, for example a kitchen worker temporarily passing in front of the camera and blocking its view of food on a grill, and to compensate for an occlusion by refraining from signaling a change in the cooking condition as might occur in a purely reactive control.

Further, the image processing controller is trainable to identify multiple indicators of the condition of a cooking appliance fire. The system preferably further includes an exhaust hood fire suppression system configured to be activated by the image processing controller signaling the exhaust fan controller upon the cooking appliance status signal indicating that there is a fire. Such fire suppression systems are known in the art; however, these are activated by other means such as a heat sensor.

Additionally, the exhaust fan controller is configured to signal a make-up air unit to adjust its control setting for make-up air volume based on the exhaust air flow volume.

Preferably, the exhaust fan controller is configured to control duct- or hood-mounted dampers.

The cooking exhaust hood system can be connected to more than one of the cooking exhaust hoods.

In addition to the exhaust fan using the cooking appliance status signal generated by the image processing controller, a hood thermostat may also be provided for redundancy.

The cooking exhaust hood system can also be used to detect when basic maintenance is required on the cooking exhaust hood or cooking appliances such as cleaning of grease filters, changing of grease filter media, changing of fryer oil, cleaning of hood surfaces, etc.

Additionally, the cooking exhaust hood system and in particular the exhaust fan controller can provide an interlock between the exhaust fans, appliance power, make-up air fans, and the fire suppression system.

In another aspect, a method of controlling a cooking exhaust hood system as noted above is provided. The method includes: a) monitoring at least one cooking appliance with the camera, and the camera signaling image data on captured images to the image processing controller; b) comparing the image data for the captured images against images in a database using the image processing controller, the image processing controller generating a cooking appliance status signal; c) and the exhaust fan controller receiving the cooking appliance status signal and adjusting at least one of a fan speed of exhaust fan to increase or decrease the controllable exhaust air flow volume or a damper position based on the cooking appliance status signal.

The method can further include activating the fire suppression system for the cooking exhaust hood upon the cooking appliance status signal indicating a fire on the at least one cooking appliance.

Further, the method preferably also includes adjusting a make-up air volume provided by the make-up air unit based on the exhaust air flow volume.

The features noted above can be used alone or in various combination to provide enhanced venting control for cooking exhaust hoods and to maintain proper building air balance.

BRIEF DESCRIPTION OF THE DRAWINGS

Further advantages and characteristics of the invention will become apparent by the below description of embodiments making reference to the accompanying drawings, in which.

DETAILED DESCRIPTION

Figure 1:
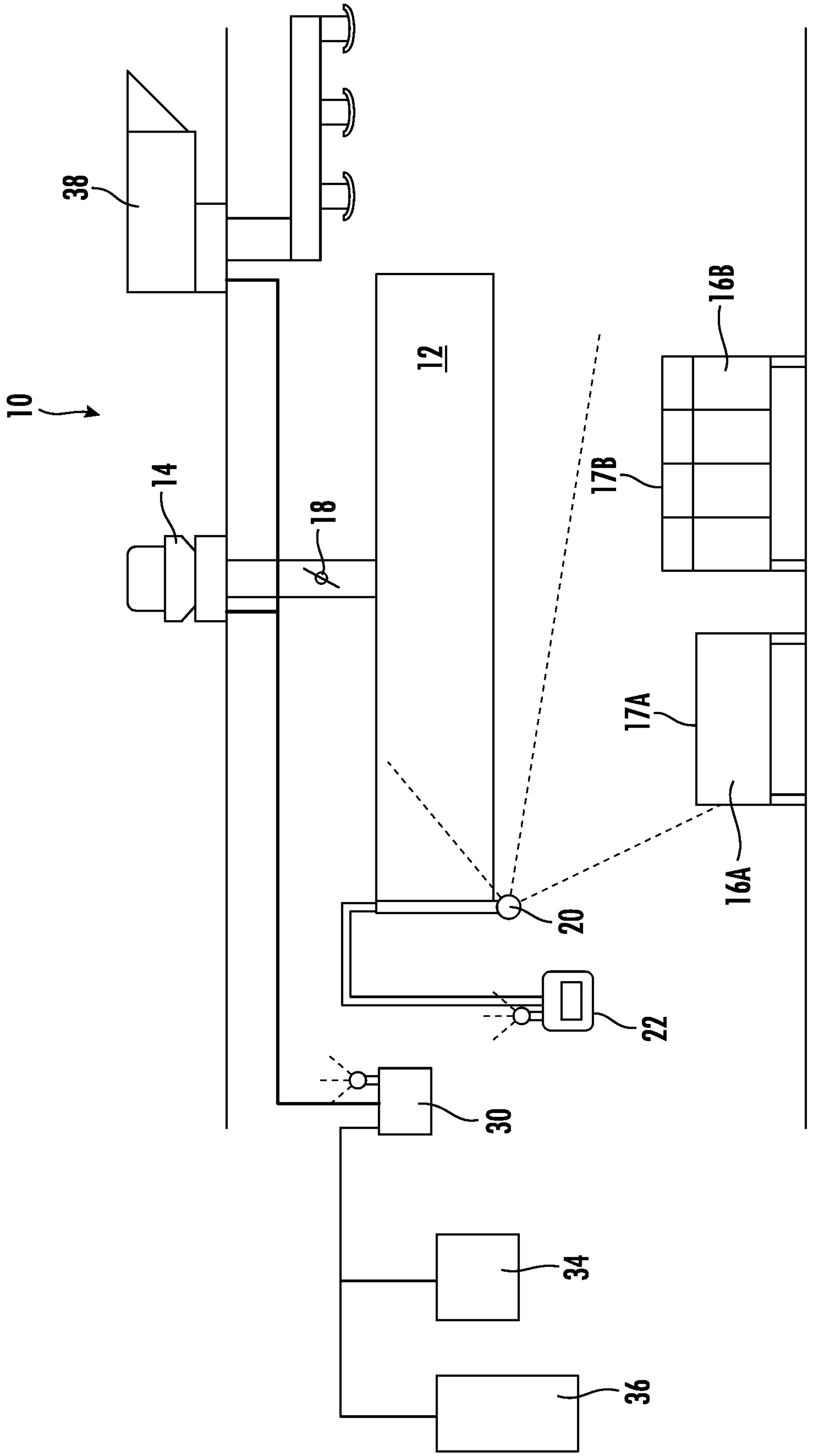
FIG. 1 is a schematic view of a cooking exhaust hood system in accordance with an embodiment of the present disclosure.

Certain terminology is used in the following description for convenience only and is not limiting. The words “right,” “left,” “top,” and “bottom” designate directions in the drawings to which reference is made. The words “a” and “one,” as used in the claims and in the corresponding portions of the specification, are defined as including one or more of the referenced item unless specifically stated otherwise. This terminology includes the words above specifically mentioned, derivatives thereof, and words of similar import. The phrase “at least one” followed by a list of two or more items, such as “A, B, or C,” means any individual one of A, B or C as well as any combination thereof. The terms approximately or generally mean within +/−10% of a specified value unless otherwise noted.

Referring to FIG. 1, a cooking exhaust hood system 10 is schematically illustrated. The exhaust hood system 10 includes an exhaust hood 12 that is adapted to be located over at least one cooking appliance 16A, 16B, and in the illustrated embodiment over two cooking appliances 16A, 16B. An exhaust fan 14, shown as an exhaust fan/motor unit, is connected to the exhaust hood 12, with the exhaust fan 14 having a controllable exhaust air flow volume. The exhaust air flow volume is preferably controlled via changing the motor speed. While a single exhaust hood 12 is shown with one exhaust fan 14, the system 10 could include multiple exhaust hoods 12 with multiple exhaust fans 14, for example, as shown schematically shown in FIG. 6.

A camera 20 is provided to monitor a surface 17A, 17B of the at least one cooking appliance 16A, 16B and provide an image signal representing a visual status of the at least one cooking appliance 16A, 16B. The camera 20 is preferably a digital video camera.

Figure 2:
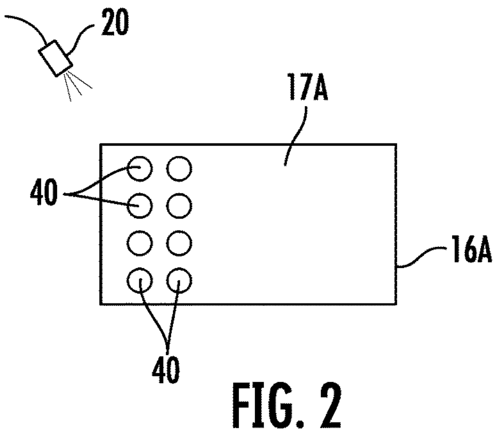
FIG. 2 is a top view looking at a surface of at least one cooking appliance that includes a first number of food items.
Figure 3:
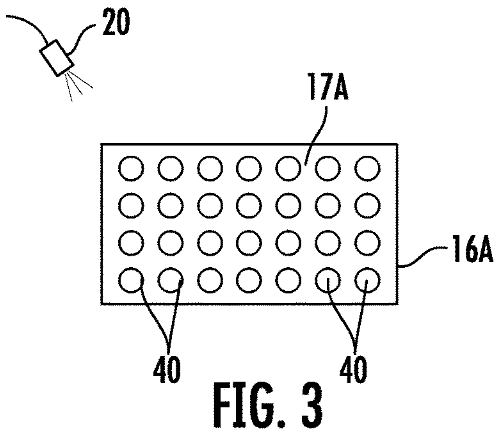
FIG. 3 is a view similar to FIG. 2 showing the surface of the cooking appliance having an increased number of food items on the surface.

An image processing controller 22, preferably including a processor that is programmed with programming logic, is connected to an image database 24. The image processing controller 22 receives the image signal from the camera 20 and compares the visual status of the at least one cooking appliance 16A, 16B based on the image signal to stored images in the image database 24 and, once it determines a match, outputs a cooking appliance status signal. The image processing controller 22 is further trainable to recognize at least one of cooking appliance conditions, for example a number, type, and/or on/off status of the cooking appliances being used, and/or food items located on the cooking appliance, and may use artificial intelligence based on image detection and matching to generate the cooking appliance status signal by matching the image captured by the camera 20 and transmitted via the image signal to the controller 22 to a corresponding image in the database 24, and then providing a corresponding output of a cooking appliance status signal. For example, referring to FIG. 2, if a certain number of food items 40, in this case 8 being shown, are located on the surface 17A of a cooking appliance 16A, the logic in the image processing controller 22 can identify this by comparing the image to the images in the image database 24 and send a representative signal, for example a "1" based on the small load on the surface 17A of the cooking appliance 16A. In contrast, as shown in FIG. 3 if the camera 20 captures an image with the surface 17A of the cooking appliance 16A covered with food items 40, the image processing controller 22 can identify this by comparing the image to the images in the image database 24 and send a signal "2" indicating a large load on the surface 17A of the cooking appliance 16A. In contrast, to the extent that no food items 40 are located on the surface 17A of the cooking appliance 16A and it is in the "ON" state, the image processing controller 22 can identify this by comparing the image to the images in the image database 24 and send a cooking appliance status signal of "0", indicating that there is no load on the surface 17A of the cooking appliance 16A.

An exhaust fan controller 30 is connected to the exhaust fan 14 and is configured to receive the cooking appliance status signal generated by the image processing controller 22, either via a wired connection or wirelessly. The exhaust fan controller 30 and the image processing controller 22 may be co-located or integrated into a single controller and fixed memory arrangement. The exhaust fan controller 30 then adjusts the controllable exhaust airflow volume of the exhaust fan 14 based on the cooking appliance status signal. For example, if the cooking appliance status signal is "0" and the cooking appliance is on, the exhaust fan controller 30 signals the exhaust fan 14 to run at a low speed (for example at 40% capacity). If the cooking appliance status signal is a 1, the exhaust fan controller 30 signals the exhaust fan 14 to run at a medium speed (for example at 60% capacity). Further, if the cooking appliance status signal is a "2", the exhaust fan controller 30 sends the exhaust fan 14 a signal to run at a higher speed (for example at 80% capacity). In this example, only 0, 1, and 2 have been used as the cooking appliance status signal for a food item load on the surface 17A of the cooking appliance 16A. However, the logic can be further differentiated based on types or sizes of the food items 40. Additional signals can also be provided, for example, if the camera 20 detects a fire or for cleaning.

Referring again to FIG. 1, the system 10 preferably further includes a fire hood suppression system 34 that is configured to be activated by the exhaust fan controller 30 upon the cooking appliance status signal indicating that there is a fire. The system 10 may further include an appliance power control 36 that can shut down power to the cooking appliances 16A, 16B in the event that a fire is detected.

Figure 4:
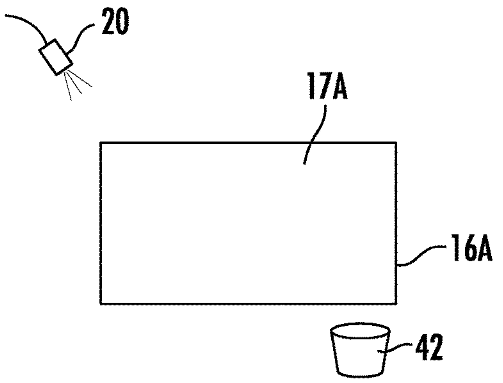
FIG. 4 is a view similar to FIGS. 2 and 3 showing the surface of the cooking appliance without any food items and also showing a piece of cleaning equipment, such as a container of water, in proximity to the cooking surface within the field of view of the camera.

Referring to FIG. 4, the image processing controller 22 is trainable to recognize not only food items 40 but also other situations, including the use of cleaning equipment, represented as a container of cleaning water 42 in FIG. 4. To the extent that cleaning water from the container 42 would generate a tremendous amount of steam when poured on a hot cooking surface 17A of the cooking appliance 16A, upon the camera 20 recognizing this type of cleaning equipment, the cooking appliance status signal that the image processing controller 22 generates could be a "3" such that the exhaust fan controller 30 recognizes this and signals the exhaust fan 14 to run at high speed (for example 100% capacity) in anticipation of the cleaning water being dumped on the surface 17A when the container 42 is detected.

Alternatively, other types of cleaning equipment being detected could result in the image processing controller 22 signaling the exhaust fan controller 30 to shut down appliance power via the appliance power control 36.

Figure 5:
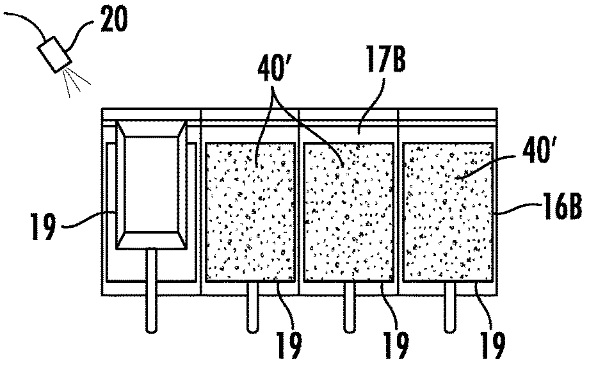
FIG. 5 is a view of a surface of a second cooking appliance, in this case a fryer having four frying baskets with associated vats of cooking oil, in which one of the baskets is shown in the ready position above the vat of cooking oil and three of the baskets are shown immersed in the cooking oil, with the entire surface of the second cooking appliance being within the field of view of the camera.

Referring to FIG. 5, another example of food items 40 is shown in connection with the cooking appliance 16B which is illustrated as a fryer having four fry vats along with four fry baskets 19. The camera 20 can recognize the number of fry baskets 19 and their position, such as the left-most fry basket 19 being hung in an idle position on the rack above the fry vat whereas the right three fry baskets 19 being placed within the respective fry vats. In this case, the image processing controller 22 can determine based on carrying out a comparison with images stored in the image database 24, the status of the cooking appliance 16B which, as shown, is three out of four fry baskets being in the fry vats, and then generates a cooking appliance status signal such as "3" that is received by the exhaust fan controller 30 which then signals the exhaust fan 14 to run at high speed (for example 100% capacity) given the cooking load on the cooking appliance 16B. Alternatively, if only a single fry basket 19 is located within a fry vat, the image processing controller 22 can send a cooking appliance status signal of "1" to the exhaust fan controller 30, which then signals the exhaust fan 14 to run at a medium speed (for example at 60% capacity) since the cooking load on the cooking appliance 16B is lower. Alternatively, if only two fry baskets 19 are located within the fry vats, the image processing controller 22 can send a cooking appliance status signal of "2" to the exhaust fan controller 30, which then signals the exhaust fan 14 to run at a higher speed (for example at 80% capacity) since the cooking load on the cooking appliance 16B is lower. To the extent that all of the fry baskets 19 are in the stowed position, the image processing controller **22*b* can recognize this and send a cooking appliance status signal of "0" to the exhaust fan 14 such that the exhaust fan controller 30 signals the exhaust fan 14 to run at low speed (for example 40% capacity) to the extent that the cooking appliance 16**B is in the "ON" state.

In a preferred embodiment, the image processing controller 22 is trainable to recognize food items 40, 40' as well as cleaning equipment 42 as well as other implements and/or conditions, such as a fire, whether grease filters or dirty and need to be cleaned, a color of fryer oil, indicating whether changing is needed, the cleanliness of hood surfaces and/or the accumulation of grease that would need to be cleaned from hood surfaces, as well as other safety and/or maintenance items. By providing images to the image database 24 of these conditions and setting up a specific logic in the image processing controller 22 for comparison of images in the image database 24 to the image captured by the camera 20 and the degree of correspondence required in the comparison (for example 80% in a pixel-by-pixel comparison), various actions in addition to controlling the fan via the exhaust fan controller 30 can also take place, such as activating the fire suppression system 34 and/or turning on/off the power to the cooking appliances 16A, 16B using the appliance power control 36.

Figure 6:
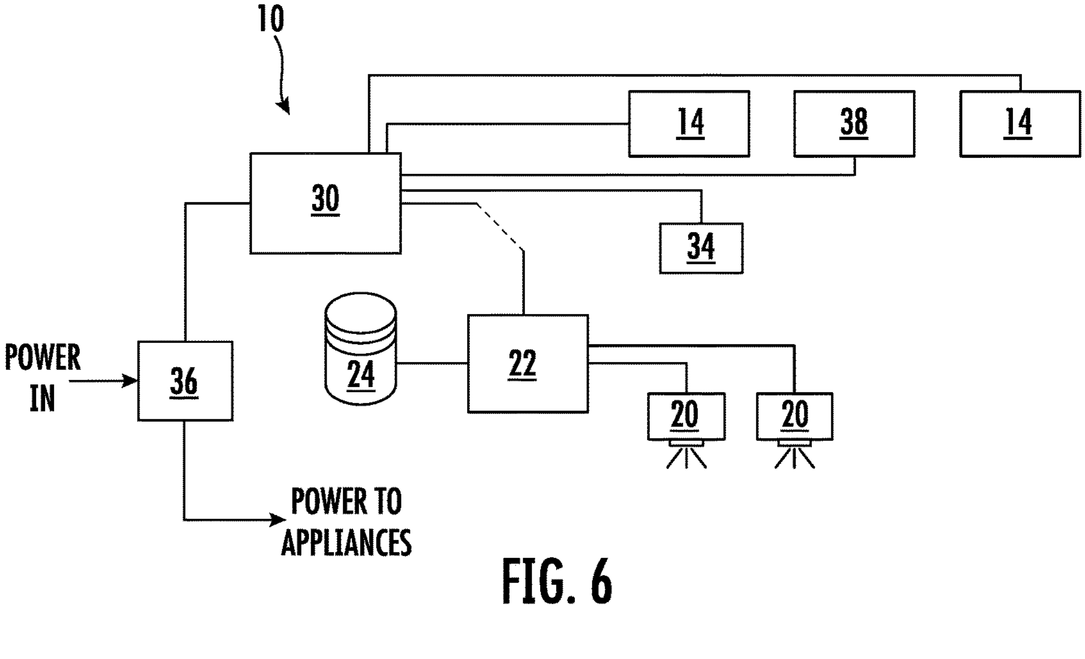
FIG. 6 is a schematic view of the cooking exhaust hood system illustrating two of the cameras and two of the exhaust fans which can be connected to separate exhaust hoods.

Referring to FIGS. 1 and 6, preferably a make-up air unit 38 is also provided to adjust a make-up air volume in the area of the cooking appliances 16A, 16B based on the exhaust air flow volume. The make-up air unit 38 is preferably controlled by the exhaust fan controller 30 and the logic in the exhaust fan controller 30 brings in the make-up air at the same volume that the exhaust air is discharged via the exhaust fan 14.

In addition, the exhaust fan controller 30 may be configured to control duct and/or hood mounted dampers, such as damper 18 in FIG. 1, depending upon particular conditions.

Figure 7:
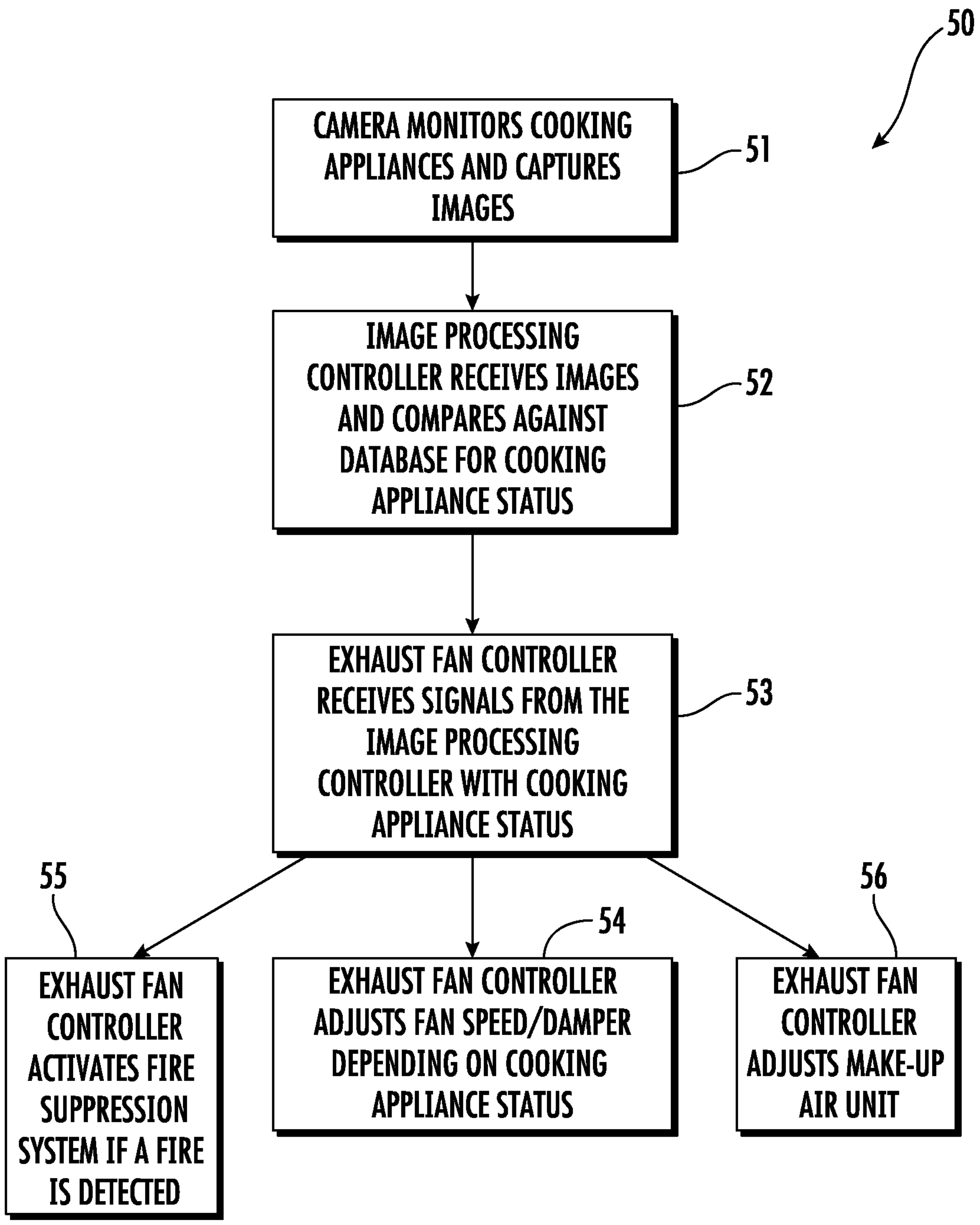
FIG. 7 is a flow chart illustrating a method for controlling a cooking exhaust hood system.

Referring now to FIG. 7, a method of controlling a cooking exhaust hood system 10 will be explained in detail in connection with the flow chart 50. The method includes monitoring the at least one cooking appliance 16A, 16B with the camera 20, and the camera 20 signaling image data on captured images to the image processing controller 22. This is indicated at 51. Next, the image data for the captured images is compared against images in the database 24 using the image processing controller 22. The image processing controller 22 then generates a cooking appliance status signal, as indicated at 52.

The exhaust fan controller 30 then receives the cooking appliance status signal and adjusts at least one of a fan speed of the exhaust fan 14 to increase or decrease the controllable exhaust air flow volume and/or adjusts a damper position of the damper 18 based on the cooking appliance status signal. This is indicated at 53 and 54 in FIG. 7.

The method may further include activating the fire suppression system 34 for the cooking exhaust hood 12 upon the cooking appliance status signal indicating a fire on the at least one cooking appliance 16A, 16B. This is indicated at 55.

The method may also include adjusting a make-up air volume provided by a make-up air unit 38 based on the exhaust air flow volume. This is indicated at 56.

Various other features can also be controlled using the method, as discussed above.

Using the invention, the exhaust fan controller 30 will run its algorithm to determine and control the exhaust fan(s) 14 based on the varying cooking load levels, which can be carried out in a predictive manner to detect based on camera images how much cooking occurs or will occur based on the recognition of certain food items 40, 40' and adjusts the ventilation/fan speed accordingly.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the ap-pended claims rather than by the foregoing description, and all alternate embodiments and changes to this embodiment which come within the meaning and range of equivalency of said claims are therefore to be embraced therein.

The invention claimed is:

1. A cooking exhaust hood system, comprising:

an exhaust hood adapted to be located over at least one cooking appliance;

an exhaust fan connected to the exhaust hood, the exhaust fan having a controllable exhaust air flow volume;

a camera that monitors a surface of the at least one cooking appliance and provides an image signal representing a visual status of the at least one cooking appliance;

an image processing controller connected to an image database, the image processing controller being configured to receive the image signal, compare the visual status of the at least one cooking appliance based on the image signal to stored images in the image database, and output a cooking appliance status signal;

an exhaust fan controller connected to the exhaust fan, the exhaust fan controller being configured to receive the cooking appliance status signal and adjust the controllable exhaust air flow volume of the exhaust fan based on the cooking appliance status signal, wherein the image processing controller is trainable to recognize cooking appliance conditions including a number and type of the cooking appliances being used as well as food items located on the cooking appliance, and the exhaust fan controller is adapted to adjust the exhaust air flow volume based on the number and type of the at least one cooking appliance being used to implement a predictive control of the exhaust air flow volume.

2. The cooking exhaust hood system of claim 1, further comprising a hood fire suppression system configured to be activated by the image processing controller upon the cooking appliance status signal indicating that there is a fire.

3. The cooking exhaust hood system of claim 1, wherein the image processing controller is trainable to recognize cleaning equipment.

4. The cooking exhaust hood system of claim 1, wherein the exhaust fan controller is configured to signal a make-up air unit to adjust a make-up air volume based on the exhaust air flow volume.

5. The cooking exhaust hood system of claim 1, wherein the exhaust fan controller is configured to control duct or hood mounted dampers.

6. A method of controlling a cooking exhaust hood system of claim 1, the method comprising:

monitoring the at least one cooking appliance with the camera, and the camera signaling image data on captured images to the image processing controller;

comparing the image data for the captured images against images in the database using the image processing controller, the image processing controller generating a cooking appliance status signal;

the exhaust fan controller receiving the cooking appliance status signal and adjusting at least one of a fan speed of exhaust fan to increase or decrease the controllable exhaust air flow volume or a damper position based on the cooking appliance status signal;

training the image processing controller to recognize cooking appliance conditions including the number and type of the cooking appliances being used as well as the food items located on the cooking appliance, and the exhaust fan controller adjusting the exhaust air flow volume based on the number and type of the at least one cooking appliance being used to implement the predictive control of the exhaust air flow volume.

7. The method of claim 6, further comprising activating a fire suppression system for the cooking exhaust hood upon the cooking appliance status signal indicating a fire on the at least one cooking appliance.

8. The method of claim 6, further comprising adjusting a make-up air volume provided by a make-up air unit based on the exhaust air flow volume.

* * * * *